United States Patent
Koo et al.

[11] Patent Number: 5,234,985
[45] Date of Patent: Aug. 10, 1993

[54] TRANSPARENT RESIN COMPOSITION RADIATING FAR INFRARED RAYS

[75] Inventors: Jung K. Koo; Sung K. Kim; Byeong S. Kim; Dong W. Han, all of Keungki, Rep. of Korea

[73] Assignee: Cheil Industries, Inc., Rep. of Korea

[21] Appl. No.: 915,944

[22] Filed: Jul. 17, 1992

[51] Int. Cl.$^5$ ............................................... C08K 3/34
[52] U.S. Cl. ................................. 524/492; 252/587; 523/300; 426/107; 524/493
[58] Field of Search ................ 524/492, 493; 426/107; 252/587; 47/9, 29, 20, DIG. 11; 523/216, 300; 423/331, 332

[56] References Cited

U.S. PATENT DOCUMENTS

| | | |
|---|---|---|
| 4,542,061 | 9/1985 | Fukushima et al. .................. 47/29 |
| 4,895,904 | 1/1990 | Allingham ........................ 426/107 |
| 4,927,651 | 5/1990 | Kumani et al. ................... 426/107 |
| 4,965,434 | 10/1990 | Nomura et al. ................... 252/587 |
| 5,084,262 | 1/1992 | Novotny et al. .................. 423/332 |

FOREIGN PATENT DOCUMENTS 61-101414  5/1986  Japan .
1-210448   8/1989  Japan .
1-271436  10/1989  Japan .

*Primary Examiner*—Veronica P. Hoke
*Attorney, Agent, or Firm*—Lieberman & Nowak

[57] ABSTRACT

A far infrared ray radiating transparent resin composition is disclosed. The composition is composed of a transparent resin and a far infrared ray radiating ceramic material. The ceramic material which is added to the resin in the amount of 1-30 weight parts, has an $SiO_2$ purity of over 96.0%, and an average particle diameter of 0.1-15 μm. The resin composition according to the present invention not only radiates far infrared rays, but also maintains transparency at an acceptable level. Therefore it can be applied to various products where the both transparency and extended freshness of food are required.

2 Claims, 2 Drawing Sheets

TRANSPARENT RESIN COMPOSITION RADIATING FAR INFRARED RAYS

FIELD OF INVENTION

The present invention relates to thermoplastic resin composition, and particularly to transparent resin composition containing ceramic material radiating far infrared rays.

BACKGROUND OF THE INVENTION

A far infrared ray radiating material is indicative of a substance which radiates far infrared rays at a high rate around room temperature. This material radiates far infrared rays having a wavelength range of 6–12 μm which corresponds to the inherent vibrating frequencies of the molecules of living creatures, therefore keeping living creatures in active state, as well as preventing living creatures from decomposition.

After discovering the effect of the far infrared ray radiating materials, methods of manufacturing food containers containing far infrared ray radiating ceramics are being developed.

Japanese Patent laid-open No. 87-164509, 89-150527, 90-53838, and 90-138367 are the examples of the conventional techniques which attempt to maintain the freshness of foods by mixing ceramics in thermoplastic or thermoset resins.

Above patents were successful in maintaining the freshness of foods by utilizing the far infrared rays radiated, but they can not provide transparency to the products due to the intrinsic properties of the resin itself or due to the insufficient compatibility between the added ceramic and the base substance which limits the application of the products where transparency is required.

SUMMARY OF THE INVENTION

The present invention is intended to overcome the above described disadvantages of the conventional techniques.

Therefore it is the object of the present invention to develop a resin composition which offers highly effective radiation of far infrared rays, transparency and good processibility. In order to achieve the desired properties, the present inventors found that thermo plastic resins with transparency and superior moldability can be obtained by high purity fine silica ceramic powders (radiating far infrared rays having wave lengths of 6–12 μm at a high efficiency) and a transparent resin having similar refractive index to the ceramic material. Uniform dispersion of ceramic powders in the matrix is essential, which is successfully accomplished in an extruder or Banburry type mixer.

BRIEF DESCRIPTION OF THE DRAWINGS

The above object and advantages of the present invention will become more apparent by describing in detail the preferred embodiments of the present invention with reference to the attached drawings in which.

DESCRIPTION OF THE PREFERRED EMBODIMENT

Figure 1:
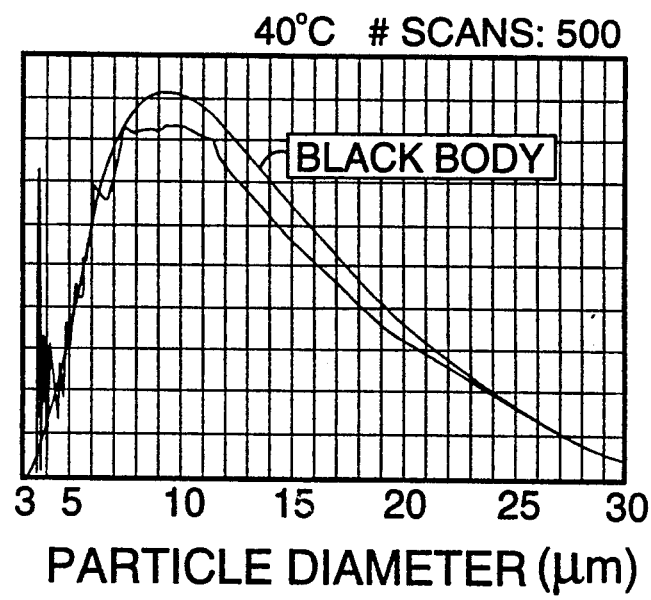
FIG. 1 illustrates the measured values of the radiation intensity of the far infrared rays for the ceramic material added in Example 2.

Examples of the base material of the present invention include transparent resins such as: polystyrene resin, styrene-acrylonitrile copolymer, polycarbonate resin, polyacrylonitrile resin, acrylic resins, and transparent acrylonitrile-butadiene-styrene copolymer.

The far infrared ray radiating ceramics which can be used in the present invention may be products processed from a raw ore such as feldspar, quartz, silica, fluorite and the like. However, $SiO_2$ should comprise at least 96% by weight of the ceramic, and most desirably over 98%. If the $SiO_2$ drops below 96%, the transparency is impaired.

In carrying out the present invention, the particle diameter of the far infrared ray radiating ceramics should be within the range of 0.1–15 μm, and, if the manufacturing cost and transparency are taken into account, the particle diameter should most desirably be within the range of 0.3–8 μm and the narrow distribution of particle size is preferred. If needed, processes such as acid treatment can be applied in order to increase the purity, and it is desirable to carry out sintering process one time or more for high radiation efficiency of far infrared rays. If the particle diameter of the ceramic material is less than 0.1 μm, a uniform dispersion of the ceramic material becomes difficult due to the agglomeration of particles, while, if the particle diameter of the ceramic material is more than 15 μm, the transparency of the final product is impaired.

First, the resin and the ceramic material are uniformly mixed by means of a mixer, and the mixer here is not limited to a specific type. Depending on the intended use, various types of the additives like lubricants, stabilizers, anti-oxidants, impact-modifiers, dispersing agents, dyestuffs, pigments, anti-bacterial agents, and anti-mould agents can be added during the mixing and the resin or ceramic can be subjected to a pre-treatment. The desirable amount of the ceramic material should be 1–30 weight parts. If the added ceramic material is less than 1 weight parts, the radiation of the far infrared rays becomes insufficient, while, if it is more than 30 weights parts, the transparency and other physical properties are deteriorated.

The uniform mixture of the resin and the ceramic material is made into pellets after melt-dispersing the composition by means of an extruder. Here, the extruder is not limited to a specific type.

The resin composition which is made into pellets is molded by applying the usual molding process such as extrusion, compression or injection, thereby obtaining a product which is acceptable in its transparency, and exhibits highly effective radiation of far infrared ray. In the products thus obtained, the far infrared ray radiating efficiency for the wave length region of 6–12 μm is desirably over 80% as against the black body.

Specific examples of the present invention are described below

EXAMPLE 1

A ceramic material having $SiO_2$ in the amount of 99.6% by weight with an average particle diameter of 5 μm and a 6–12 μm far infrared ray radiating efficiency of 91% was added in the amount of 7 weight parts into a polystyrene resin, and a small amount of a lubricant was also added into it. Then they were mixed together by means of a Henschel mixer, and then, the mixture was made into pellets by means of a single screw extruder of 40 mm diameter. In an injection-molding plane of the resin composition having a thickness of 2.5 mm, the parallel optical transmittance relative to the total transmittance was 30–40%, and the transparency could be confirmed even with the naked eyes. In a compression-molded plane having a thickness of 0.5 mm, the radiation intensity and the radiation efficiency of the far infrared rays were measured to obtain the result that the radiation intensity closely approached to that of the black body, and that the radiation efficiency for the wave length region of 6–12 μm was 89% as against the black body.

An injection-molded food container product of the resin composition was evaluated by filling food stuff into the containers and storing the container in a refrigerator. The evaluated result is shown in Table 1 below.

EXAMPLE 2

In order to improve the purity, an acid treatment was carried out, and sintering was carried out two times at a temperature of 500°–1500° C. As a result, a far infrared ray radiating ceramic material was obtained in which the $SiO_2$ purity was 99.6%, the average particle diameter was 2.5 μm, and the far infrared ray radiating efficiency for the wave length region of 6–12 μm was 94%. This ceramic material together with a small amount of a lubricant, and then, they were mixed together by means of a Henschel mixer. Then the mixture was made into pellets by means of a 2-shaft extruder of 40 mm diameter.

In an injection-molded plane made of the resin composition and having a thickness of 2.5 mm, the parallel optical transmittance relative to the total transmittance was 50–60%, while its transparency could be confirmed even with the naked eyes. In a compression-molded plane of the resin composition having a thickness of 0.5 mm, measurements showed that its radiation intensity closely approached to that of the black body, and that its radiation efficiency for the wave length region of 6–12 μm was 92% as against the black body.

Figure 2:
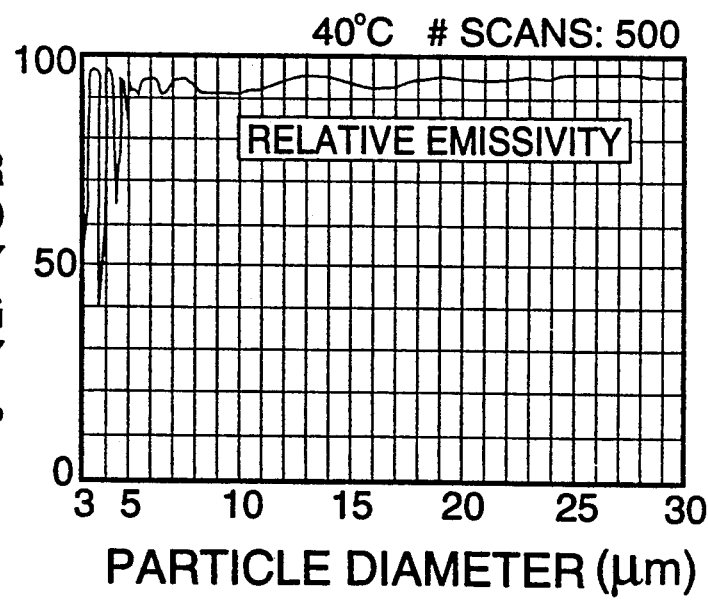
FIG. 2 illustrates the measured values of the far infrared ray radiating efficiency for the added ceramic material of Example 2 as against the black body.
Figure 3:
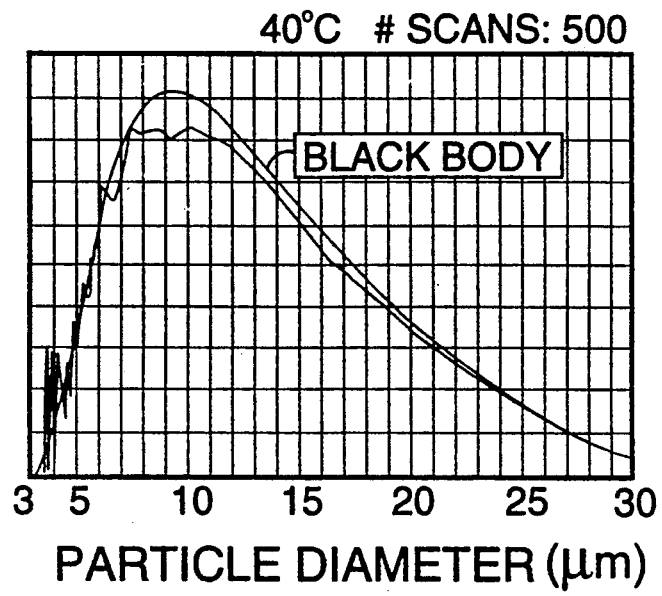
FIG. 3 illustrates the measured values of the radiation intensity of the far infrared rays for the resin composition of Example 2.
Figure 4:
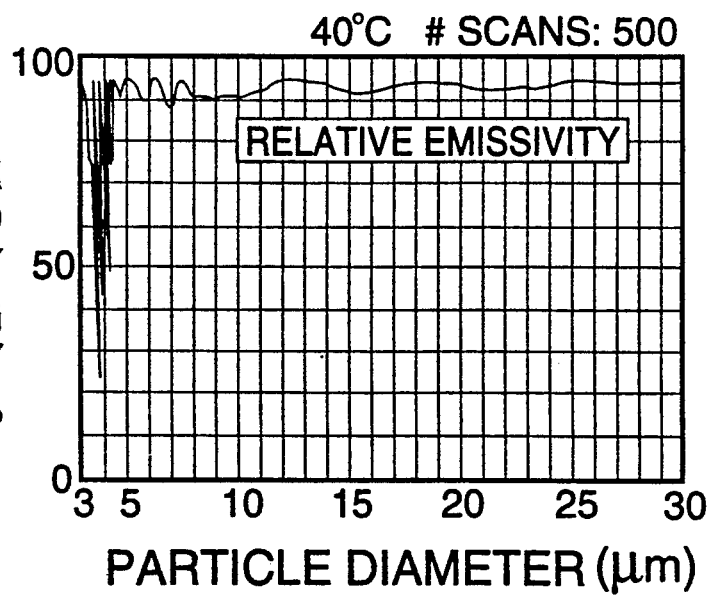
FIG. 4 illustrates the measured values of the radiation efficiency for the resin composition of Example 2 as against the black body.

An injection-molded food container made of the resin composition was evaluated by filling food stuff into the food container, and by storing the food container in a refrigerator. The result is as shown in Table 1 below, and the ceramic material and the resin composition gave radiation intensities and radiation efficiencies as against the black body as illustrated in FIGS. 1 to 4.

EXAMPLE 3

A far infrared ray radiating ceramic material was prepared in which the $SiO_2$ purity was 99.5%, the average particle diameter was 7.0 μm and the far infrared ray radiating efficiency for the wavelength region of 6–12 μm was 92%. This ceramic material was added in the amount of 4 weight parts into a polycarbonate resin, mixed together by means of a Henschel mixer. Then the mixture was made into pellets by means of a single-shafted extruder of 40 mm diameter.

In an injection-molded plane made of the above resin composition and having a thickness of 2.5 mm, the parallel optical transmittance relative to the total transmittance was 30–50%, and the transparency could be confirmed even with the naked eyes. In a compression-molded plane made of the above resin composition and having a thickness of 0.5 mm, measurements showed that the radiation intensity closely approached to that of the black body, and that the radiation efficiency for the 6–12 μm wave length region was 89% as against the black body.

A food container which is injection-molded using the above resin composition was evaluated by filling food stuff into the container and storing the container in a refrigerator. The result is as shown in Table 1 below.

Comparative Example 1

A far infrared ray radiating ceramic material was prepared in which the $SiO_2$ purity of the ceramic was 99.0 weight %, with an average particle diameter was 30.0 μm. This ceramic material was added in the amount of 5 weight parts together with a small amount of a lubricant into a polystyrene resin, and they were mixed together by means of a Henschel mixer, and then the mixture was made into pellets by means of a single-shafted extruder of 40 mm diameter.

The resin composition had a dark gray color, and an injection-molded plane made of this resin composition had a thickness of 2.5 mm and was completely opaque.

Comparative Example 2

A far infrared ray radiating ceramic material was prepared in which $SiO_2$ proportion was 92%, $Al_2O_3$ proportion was 7.0%, proportion for others was 1%, the average particle diameter was 7.0 μm, and the far infrared ray radiating efficiency for the 6–12 μm wave length region was 90%.

This far infrared ray radiating ceramic material was added in the amount of 4 weight parts together with a small amount of lubricant into a styrene-acrylonitrile copolymer. They were mixed together by means of Henschel mixer, and the mixture was made into pellets by means of a single-shafted extruder of 40 mm diameter.

This resin composition had a dark gray color, and an injection-molded plane made of the resin composition had a thickness of 2.5 mm and was completely opaque.

Comparative Example 3

A far infrared ray radiating ceramic material was prepared in which $SiO_2$ proportion was 86.0%, $Al_2O_3$ proportion was 12.0%, proportion for others was 2%, the average particle diameter was 5.0 μm, and the radiation efficiency for the 6–12 μm wave length region was 91%. This far infrared ray radiating ceramic material was added in the amount of 4 weight parts into a polycarbonate resin. They were mixed together by means of a Henschel mixer, and the mixture was made into pellets by means of a single-shafted extruder of 40 mm diameter.

This resin composition had also a dark gray color, and an injection-molded plane made of the resin composition had a thickness of 2.5 mm and was also completely opaque.

As can be seen through the above examples and comparative examples, the resin composition according to the present invention not only radiates far infrared rays, but also shows an acceptable transparency. Therefore composition can be applied to products in which freshness of foods and transparency are required such as refrigerator components, food containers and the like.

TABLE 1

Comparison of Freshness of Foods for Different Containers

| Test piece | Ordinary container | Container of Example 1 | Container of Example 2 | Container of Example 3 |
|---|---|---|---|---|
| Pork | Water flowed out much on 2nd day, and decomposed on 10th day | Water flowed out slightly on 4th day, and decomposed on 15th day | Water flowed out slightly on 4th day, and decomposed on 16th day | Water flowed out slightly on 4th day, and decomposed on 14th day |
| Crab | Water flowed out on first day, and decomposed severely on 2nd day | Water flowed out slightly on 2nd day, and decomposed on 4th day | Water flowed out slightly on 2nd day, and decomposed on 4th day | Water flowed out slightly on 2nd day, and decomposed on 4th day |
| Strawberry | Softened on the surface on 2nd day, and decomposed on 13th day | Softened on the surface on 4th day, and decomposed on 17th day | Softened on the surface on 4th day, and decomposed on 18th day | Softened on the surface on 4th day, and decomposed on 16th day |
| Apple | Dried on first day slightly, and shrunk severely on 4th day | Dried on 2nd day slightly, and shrunk severely on 7th day | Dried on 2nd day slightly, and shrunk severely on 7th day | Dried on 2nd day slightly, and both poles shrunk on 6th day |

What is claimed is:

1. A far infrared ray radiating transparent resin composition, which comprises 100 weight parts of a transparent resin and from 1 to 30 weight parts of a ceramic material having an average particle diameter of from 0.1 to 15 $\mu$m, the ceramic material being formed from greater than 96 weight % $SiO_2$.

2. The far infrared ray radiating transparent resin composition as claimed in claim 1, wherein the transparent resin comprises one or more resins selected from the group consisting of: polystyrene, styrene-acrylonitrile copolymer, polycarbonate, acrylic resin, transparent acrylonitrile-butadiene-styrene copolymer, styrene-butadiene copolymer, styrene-butadiene-styrene copolymer and polyacrylonitrile resin.

* * * * *